United States Patent [19]

Menzi et al.

[11] 4,244,982
[45] Jan. 13, 1981

[54] PROCESS FOR PREPARING A FOOD MOUSSE

[75] Inventors: Robert Menzi, Geneva; Georges Dove, Carouge, both of Switzerland

[73] Assignee: W. R. Grace & Co., New York, N.Y.

[21] Appl. No.: 16,762

[22] Filed: Mar. 2, 1979

Related U.S. Application Data

[63] Continuation of Ser. No. 820,121, Jul. 29, 1977, abandoned.

[30] Foreign Application Priority Data

Aug. 5, 1976 [CH] Switzerland .................. 10045/76

[51] Int. Cl.$^3$ ............................................. A23L 1/32
[52] U.S. Cl. ..................................... 426/568; 426/520
[58] Field of Search ....................... 426/568, 407, 520

[56] References Cited

U.S. PATENT DOCUMENTS 1,686,556  10/1928  Griswold ..................... 426/568

OTHER PUBLICATIONS

Culinaire Encyclopedie, Amsterdam Elsvier, Brussel, 1962, p. 234.
Campbell, E., Encyclopedia of World Cookery, Spring Books, 1968, p. 275.

*Primary Examiner*—Jeanette M. Hunter
*Attorney, Agent, or Firm*—Michael J. McGreal

[57] ABSTRACT

A mousse food product capable of withstanding sterilization or pasteurization temperatures and procedures is produced by comixing a food such as a fruit or vegetable puree with an aerated albumen protein substance such as egg white at a temperature of greater than about 60 degrees C., whereby the egg white coagulates and sets to an aerated low density structure capable of undergoing sterilization or pasteurization.

12 Claims, No Drawings

PROCESS FOR PREPARING A FOOD MOUSSE

This is a continuation of application Ser. No. 820,121 filed July 29, 1977 now abandoned.

The present invention relates to a process for preparing a food product consisting essentially of a mousse of food, especially cooked vegetables or fruit.

The term "mousse" denotes a relatively light product (i.e. light in relation to the food) having a spongy or foam structure and consisting of an aerated food such that it contains a large number of cells which can communicate with one another (open cells) or are separated from one another (closed cells), those cells being formed by air bubbles in the food.

The preparation of a mousse of cooked vegetables or fruit does not in principle present any difficulty in the case where such a mousse is to be consumed immediately or shortly after its preparation. In fact, the preparation may be carried out simply by beating a puree of cooked food, hot or cold, sufficiently vigorously to incorporate a sufficient amount of air bubbles in the puree. This beating may be performed either by hand, using a hand beater or whisk, or by means of a conventional type of mechanical beating apparatus.

The use of known aeration agents, such as aqueous solutions of proteins, in particular aeration agents which are known by the name "HYFOAMA" and which consist of aqueous solutions of proteins extracted from milk and gluten, facilitates the preparation of mousses and stabilises their structure.

The mousses thus obtained do, however, possess the disadvantage that they lose their spongy structure, with a consequent increase in density and reversion to the consistency of the initial puree, when they are heated, especially if it is attempted to sterilise or pasteurise them by stoving or heating with steam. Accordingly, hitherto it has not been possible to prepare mousses of cooked vegetables or fruits on an industrial scale, because these have to be subjected to heat sterilisation or pasteurisation in order to confer a sufficiently long life on them, despite the obvious interest in such products.

The present invention provides a process which enables a mousse to be obtained which is capable of being heat-sterilised or pasteurised in the usual way without any significant deterioration in its structure or increase in its initial density.

According to the present invention, there is provided a process for preparing a food mousse, which comprises incorporating an albumen proteinaceous substance, usually egg white, beaten stiff into a food having a liquid consistency, typically a cooked food puree, while stirring the food at a temperature sufficiently high to cause the proteinaceous substance to coagulate as it is incorporated, so as to confer a spongy structure on the resulting mixture.

The albumen, which in the subsequent description will be referred to as egg white is incorporated to confer a spongy structure on the mixture. By egg white "beaten stiff" is meant egg white which has been beaten to such an extent that it is capable substantially of holding its shape. It will in general be dry. The achievement of the desired consistency can generally be ascertained by a change in the sound of the mixture during beating.

The amount of egg white, expressed in weight of dry material, is preferably from 0.05 to 2% by weight based on the total weight of the mixture.

When preparing a mousse based on a cooked fruit puree, the optimum amount of egg white used is generally from 0.05 to 0.5% by weight (dry material) based on the total weight of the mixture, and is lower the higher the acidity (lower pH value) of the initial cooked fruit puree.

When preparing a mousse based on a cooked vegetable puree, the optimum amount of egg white is generally from 0.5 to 2% by weight (dry material) based on the total weight of the mixture. In general, however, amounts as little as 1/10 of the lower limits and as high as 3 to 5 times the upper limits can be used.

It is immaterial whether fresh egg white or egg white reconstituted from egg white powder and a suitable amount of water is used as the egg white.

It is important that the temperature of the food be sufficiently high when the egg white is incorporated to ensure that the latter is coagulated. A temperature of the order of 60° to 75° C. or 70° to 80° C., say 60° to 80° C., is most suitable although temperatures from, say, 60° to 140° C. are generally possible. The actual coagulation temperature depends to some extent on the nature of the food. Thus with a vegetable puree which generally has an approximately neutral pH a temperature of 60° to 70° C. is frequently suitable. With a fruit puree, however, which will usually have an acidic pH somewhat lower temperatures can be used although if a temperature below 60° C. is used there will be a tendency for the egg white to solubilise. If high temperatures are used it is necessary to incorporate the egg white at a faster rate which can be difficult. The taste of the product can be affected if temperatures above 140° C. are used.

The aim of the incorporation of the beaten egg white is to introduce into the food air bubbles which are coated with a layer of protein and to disperse these air bubbles carefully throughout the food. It is generally possible to achieve this in 1 to 5 minutes, for example about 2 minutes; it will be appreciated that faster incorporation (required if high temperatures are used) can be difficult since the density of the beaten egg white is very low compared to that of the food. The incorporation should be carried out carefully and not too vigorously so as not to break the air bubbles; in general the mixing should not, itself, introduce air into the product. Although the product can contain open and/or closed cells, the preferred products are ones in which substantially all the entrapped air is in the form of closed cells.

It will be appreciated that once the beaten egg white has been incorporated the product does not undergo any further increase in volume and it is not subjected to a specific cooking or baking step. After the incorporation the product can be sterilised or pasteurised in the usual manner. Thus sterilisation can be achieved by packaging the product in, for example, cans and subjecting the latter to "retorting" i.e. to a temperature of the order of 120° C. for, say, 60 to 90 minutes, the precise time used being dependent on the dimensions of the package. Pasteurisation is suitably carried out at a temperature of 60° to 90° C. for, say, 5 to 10 or 20 minutes although high temperature pasteurisation at, say, 140° C. is also possible. As stated above it is a particular advantage of the process of the present invention that the mousse products can withstand these treatments substantially without detriment.

It should be noted that the presence of coagulated egg white in a vegetable or fruit mousse prepared by the process of this invention does not noticeably affect the taste or the other organoleptic properties of the starting puree and cannot be detected when eaten.

It is to be understood that the starting food may inherently contain a desired flavour as is generally the case with a puree based on meat, fish, vegetables and fruit or a flavouring agent may be added to a food not having a significant inherent flavour to give it a desired flavour as is the case with a custard or "pudding" which usually comprises a thickened composition to which a flavouring agent, for example a chocolate, coffee or vanilla flavour, is added.

The composition of the starting puree can be chosen as desired from the usual compositions including those based on meat, fish, vegetables and fruit, those based on vegetables and fruit being preferred. The puree may contain the normal amounts of ingredients conventionally employed in purees and mousses and, in particular, sugar or sweetening agents, gelling or thickening agents such as carob bean flour, guar powder, starch including potato starch, wheat flour or flour of other cereals, fats such as butter, flavouring agents and condiments such as sodium glutamate and sodium chloride. The basic fruit or vegetable will generally amount to 50 to 95% by weight of the puree, for example 55 to 85% by weight in the case of vegetables and 85 to 95% by weight in the case of fruit. The water content of the puree can also be within the normal limits. The puree is, of course, usually cooked.

The composition of the custard- or pudding-type base can likewise be chosen from the usual thickened products containing a thickening agent such as those mentioned above as well as the other ingredients mentioned for the purees. With such products the egg white content can sometimes be somewhat higher than with the vegetable and fruit purees.

The following Examples 1 to 6, 9 and 10 further illustrate the present invention. In each case the mousse obtained may be packed in containers and sterilised in the usual way without causing any change in its structure and consistency or any increase in its density.

Examples 7 and 8 are included by way of comparison.

EXAMPLE 1

(Preparation of a green pea mousse)

(a) Starting ingredients: (amounts expressed in percentage by weight)

| Deep frozen peas: | 67.9 |
| --- | --- |
| Sodium chloride: | 0.68 |
| Water: | 21 |
| Guar powder: | 0.13 |
| Saccharose: | 0.45 |
| Ordinary (cow's) butter: | 2.26 |
| Ordinary (cow's) cream: | 2.26 |
| Dried egg white: | 0.9 |
| Water: | 4.5 |

*Mixture of water and dried egg white incorporated in the form of reconstituted egg white (b) Method The peas are cooked in boiling water for 30 minutes in the presence of salt, pepper and sugar, and the normal amount of parsley an onion as "garnish" and flavouring agent. When the peas are cooked the "garnish" is removed and the remainder is passed to a vegetable mill or any equivalent industrial machine. Guar, cream and butter are then added to the puree thus obtained, salt is added, and the egg white, previously reconstituted and beaten stiff, is incorporated hot (about 70° to 80° C.).

The incorporation of the egg white beaten stiff into the puree takes about 2 minutes, while stirring the mixture thoroughly with a mixer of the "HOBART" type.

A highly aerated mousse is thus obtained, formed from open cells having a diameter varying between about 0.05 and 0.5 mm, and whose density is 0.88 g/cm³.

EXAMPLE 2

(Preparation of a celery mousse)

(a) Starting ingredients: (amounts expressed in percentage by weight)

| Fresh celery: | 59.1 |
| --- | --- |
| Rice: | 3.7 |
| Wheat flour: | 0.74 |
| Sodium chloride: | 0.55 |
| Guar powder: | 0.11 |
| Normal (cow's) butter: | 1.8 |
| Skimmed cow's milk: | 29.5 |
| Dried egg white: | 0.75 |
| Water: | 3.7 |

*Incorporated in the form of egg white.

(b) Method

Celery cut up into pieces is added to salted boiling water, followed by the rice and lemon juice (half a lemon for 5 liters of water), and the mixture is then allowed to cook over a moderate heat for about 35 minutes, the froth being removed from the surface of the pan. After cooking, the celery pieces are drained and reduced to puree (in a vegetable mill or equivalent industrial device).

The butter and a mixture containing the wheat flour and the guar are incorporated in the puree thus obtained, the latter is salted, and the hot milk is added.

Finally, the reconstituted egg white beaten stiff is incorporated hot (70° to 80° C.) into the puree. (Incorporation time: 2 minutes, with continuous thorough stirring).

A mousse having a similar structure to the mousse obtained in Example 1 is obtained, with a density of 0.91 g/cm³.

EXAMPLE 3

(Preparation of a spinach mousse)

(a) Starting ingredients: (amounts expressed in percentage by weight)

| Deep frozen spinach leaves: | 66.7 |
| --- | --- |
| Flour: | 1.0 |
| Potato starch: | 1.3 |
| Sodium chloride: | 0.77 |
| Guar powder: | 0.1 |
| Cow's butter: | 2.8 |
| Cow's cream: | 2.8 |
| Skimmed cow's milk: | 20.5 |
| Dried egg white: | 0.67 |
| Water: | 3.3 |

*Incorporated in the form of reconstituted egg white (b) Method

The spinach is cooked for about 15 minutes in boiling water (4 to 5 liters of water for 2 kg of spinach) containing 10 g of salt per liter, in an uncovered pan, and the foam is skimmed off as it is formed.

After cooking, the spinach is strained and cooled with cold water. The spinach is pressed to remove excess water and is then made into a puree (by means of a vegetable mill or an equivalent industrial device).

The butter is incorporated into the puree thus obtained, the puree is salted, and peppered and the mixture containing the flour, starch and guar are added. The mixture is then made completely homogeneous by beating it with a whisk, and the cream and hot milk are added. Finally, the reconstituted egg white beaten stiff is incorporated hot (about 70° to 80° C.) into the puree. Incorporation time: 2 minutes while stirring continuously.

An aerated mousse is thus obtained whose density is 0.870 g/cm³.

EXAMPLE 4

(Preparation of a French bean mousse)

(a) Starting ingredients: (proportions expressed in percentage by weight)

| Deep frozen French beans: | 78.8 |
|---|---|
| Spinach leaves: | 2.6 |
| Kidney-beans: | 2.6 |
| Sodium chloride: | 0.94 |
| Sodium glutamate: | 0.16 |
| Cow's butter: | 4.2 |
| Wheat flour: | 2.0 |
| *Dried egg white: | 0.58 |
| *Water: | 2.9 |
| Extra water: | 5.2 |

*Incorporated in the form of reconstituted egg white.

(b) Method

The French beans and spinach are added to salted boiling water (3 liters of water per 1 kg of vegetables) and allowed to cook over a strong heat in an uncovered vessel for one hour.

After cooking, the vegetables are strained and made into a puree (vegetable mill or equivalent industrial device).

The wheat flour and butter are incorporated in succession into the puree thus obtained.

Finally, the reconstituted egg white beaten stiff is incorporated hot (70° to 80° C.) into the puree. (Incorporation time: 2 minutes with constant thorough stirring).

A mousse is obtained having a specific weight of 0.89 g/cm³.

EXAMPLE 5

(Preparation of a French bean mousse having a density less than that of the mousse obtained according to Example 4)

The procedure described in Example 4 is followed, using the starting ingredients in the following proportions (expressed in percentage by weight):

| Deep frozen French beans: | 76.2 |
|---|---|
| Spinach leaves: | 2.5 |
| Kidney-beans: | 2.5 |
| Sodium chloride: | 0.9 |
| Sodium glutamate: | 0.15 |
| Cow's butter: | 4.0 |
| Wheat flour: | 1.9 |
| *Dried egg white: | 1.14 |
| *Water: | 5.7 |
| Additional water: | 5.0 |

*Incorporated in the form of reconstituted egg white.

A mousse is obtained having a similar structure to the mousse obtained according to Example 4, but with a density of 0.75 g/cm³ (which is about 84% of the density of the mousse obtained according to Example 4).

EXAMPLE 6

(Preparation of a salsify mousse)

A procedure similar to that described in Example 2 is adopted, the following ingredients being used (in amounts expressed in percentage by weight):

| Deep frozen salsify: | 78.8 |
|---|---|
| Wheat flour: | 1.0 |
| Potato starch: | 0.52 |
| Sodium chloride: | 0.52 |
| Cow's butter: | 2.62 |
| Water (for the cooking): | 10.5 |
| *Dried egg white: | 1.0 |
| *Water: | 5.2 |

*Incorporated in the form of reconstituted egg white.

A mousse is thus obtained having a structure similar to that of the mousse obtained according to Example 2, and whose density is 0.8 g/cm³.

This mousse is much lighter than the starting puree, whose density is 1.02 g/cm³.

Thus the incorporation of a very small amount of egg white into this puree thus enables a mousse to be obtained having a density corresponding to only 78% of the density of the puree.

EXAMPLE 7 (comparative)

A procedure similar to that described in Example 6 is adopted using 77.8% of salsify (by weight) and replacing the reconstituted egg white by an amount of a known aeration agent (aqueous solution of proteins obtained from milk and gluten, commercially sold under the name "HYFOMA") corresponding to 3% by weight of the total amount of ingredients. This aeration agent is also beaten stiff before being added to the salsify puree.

Instead of a mousse, a puree is obtained which is substantially identical in appearance to the starting puree and has the same density (1.02 g/cm³) as the latter.

EXAMPLE 8 (comparative)

The procedure of Example 7 is adopted, but the incorporation of the aeration agent is effected at ambient temperature (20° C.).

A mousse is obtained having a density of 0.9 g/cm³. However, if this mousse is sterilised with steam, after being packed in containers, in the usual manner, its volume decreases by about a third and its density rises to 1.02 g/cm³, equal to the density of the starting salsify puree.

A comparison between Examples 6, 7 and 8 shows the decisiveness of the use of beaten egg white.

EXAMPLE 9

(Preparation of an apple mousse)

(a) Starting ingredients: (amounts expressed in percentage by weight)

| Peeled apples: | 91.0 |
|---|---|
| Sucrose: | 7.28 |
| Carob flour: | 0.45 |

-continued

| | | |
|---|---|---|
| | Potato starch: | 0.45 |
| { | Dried egg white: | 0.14 |
| | Water: | 0.68 |

*Incorporated in the form of reconstituted egg white.

(b) Method

The apples are cooked in steam for 2 minutes at 120° C. and are then made into a puree, and the puree thus obtained is mixed uniformly with the sucrose, carob flour and potato starch. A homogeneous puree is thus obtained whose density is 1.04 g/cm³. Finally, the reconstituted egg white, beaten stiff, is incorporated hot (70° to 80° C.) into the puree while stirring the mixture thoroughly.

A mousse is obtained having a density of 0.83 g/cm³.

The density of this mousse thus corresponds to 80% of that of the starting puree.

EXAMPLE 10

(Preparation of an apple mousse using an amount of egg white corresponding to about half the amount which is used according to Example 9)

A procedure identical to that described in Example 9 is adopted, but with the following amounts of starting ingredients (expressed in percentage by weight):

| | | |
|---|---|---|
| | Peeled apples: | 91.343 |
| | Sucrose: | 7.303 |
| | Carob flour: | 0.46 |
| | Potato starch: | 0.46 |
| { | Dried egg white: | 0.073 |
| | Water: | 0.36 |

*Incorporated in the form of reconstituted egg white.

A mousse is obtained having a density of 0.9 g/cm³.

We claim:

1. A food product consisting of an aerated coagulated albumen and having a food dispersed herein, and having a spongy, cellular foam structure, produced by the process comprising:
   (a) preparing a puree of a food and maintaining said puree at greater than about 60° C.;
   (b) vigorously mixing an albumen proteinaceous substance, said mixing being sufficient to incorporate a substantial amount of air therein and yield a substance capable of substantially holding its foam shape;
   (c) maintaining said puree at greater than about 60° C. by the addition of heat and incorporating said mixed albumen proteinaceous substance into said puree with a non-vigorous type of mixing for a period of 1 to 5 minutes whereby said albumen proteinaceous substance is coagulated during such mixing to form a set cellular foam structure food product which can be subjected to sterilization or pasteurization temperature without changing the aerated low density structure of said food product.

2. A food product as in claim 1 wherein said protein substance is egg white.

3. A food product as in claim 2, wherein egg white is incorporated in an amount from 0.05 to 2 weight percent dry basis based on the total dry weight of said food product.

4. A food product as in claim 2 wherein said food is selected from the group consisting of fruits and vegetables and mixtures thereof.

5. A food product as in claim 4 wherein said food is a vegetable.

6. A food product as in claim 4 wherein said food is a fruit.

7. A method for producing a food product having a spongy, cellular foam structure which is capable of subsequently being subjected to temperatures sufficient to sterilize or pasteurize said food product without volumetrically changing the aerated low density structure of said food product comprising:
   (a) preparing a puree of food and maintaining said puree at greater than about 60° C.;
   (b) vigorously mixing an albumen proteinaceous substance, said mixing being sufficient to incorporate a substantial amount of air therein and yield a substance capable of substantially holding its foam shape; and
   (c) maintaining said puree at greater than about 60° C. by the addition of heat and incorporating said mixed albumen proteinaceous substance into said puree with a non-vigorous type of mixing for a period of 1 to 5 minutes whereby said albumen proteinaceous substance coagulates during such mixing to form a set cellular foam structure of food product which can be subjected to sterilization or pasteurization temperatures without changing the aerated low density structure of said food product.

8. A method for producing the food product of claim 7 wherein said albumen proteinaceous substance is egg white.

9. A method for producing the food product of claim 7 wherein said egg white is comixed in an amount from 0.05 to 0.5 weight percent dry basis based on the total dry weight of the food product.

10. A method for producing the food product of claim 8 wherein said food is selected from the groups consisting of fruits and vegetables and mixtures thereof.

11. A method for producing the food product of claim 10 wherein said food is a fruit.

12. A method of producing the food product of claim 10 wherein said food is a vegetable.

* * * * *